Feb. 6, 1923. 1,444,685.
R. M. HOPKINS.
SIGNALING SYSTEM AND RELAY THEREFOR.
FILED JULY 5, 1919.
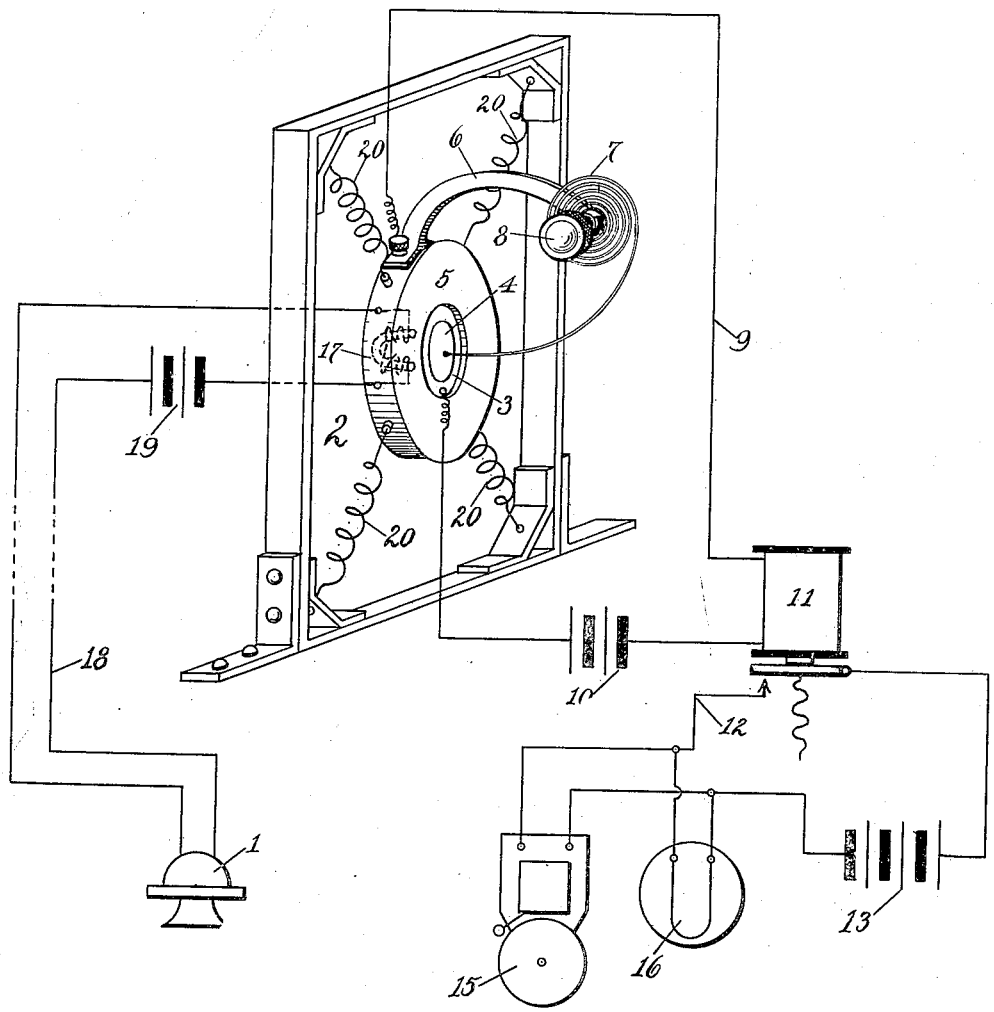
INVENTOR.
R. M. Hopkins
BY
ATTORNEY.

Patented Feb. 6, 1923.

1,444,685

UNITED STATES PATENT OFFICE.

RICHARD M. HOPKINS, OF RUTHERFORD, NEW JERSEY, ASSIGNOR TO AMERICAN DISTRICT TELEGRAPH COMPANY, OF JERSEY CITY, NEW JERSEY, A CORPORATION OF NEW JERSEY.

SIGNALING SYSTEM AND RELAY THEREFOR.

Application filed July 5, 1919. Serial No. 308,788.

*To all whom it may concern:*

Be it known that I, RICHARD M. HOPKINS, a citizen of the United States of America, and resident of Rutherford, county of Bergen, and State of New Jersey, have invented a Signaling System and Relay Therefor, of which the following is a specification.

My invention relates generally to alarm systems or detection systems, more especially to systems for the protection of vaults and the like from burglary, and is designed to give a positive and reliable automatic indication at a central office when any attempt is made to break into or enter any vault protected by it. By this system the ordinary expensive wire or foil linings covering the walls, ceilings, and floors of vaults are not required, and means is provided whereby sounds, inevitably made in attempts to break into or otherwise enter the protected premises, cause the sending of an alarm to the central station.

According to the present invention a detector, usually of the nature of a sensitive telephone receiver, is connected by a suitable circuit to a species of relay, comprising a diaphragm arranged to be vibrated by the current waves produced by the operation of the detector, and a contact spring of low period of vibration as compared with the period of vibration of the relay diaphragm under the influence of the detector-produced current waves, such contact spring normally pressing lightly against the diaphragm. When the diaphragm is in vibration under the influence of the detector, the contact spring is in contact with said diaphragm very briefly only, at well separated intervals, and in effect, there is an open circuit between the diaphragm and contact spring. The relay controls electrically suitable signal receiving means.

My invention therefore comprises a detector, a relay of the type referred to arranged to be operated thereby, and signal receiving means arranged to be operated by said relay. Other features of my invention will be pointed out hereafter.

The object of my invention is to provide a detection system of extreme simplicity and great reliability under conditions for which it is suited, and the cost of maintenance of which is low.

The accompanying drawing illustrates, diagrammatically, a system embodying my invention.

In the drawing, 1 designates a detector, adapted to be located in or about the premises to be protected, and usually of the general nature of a telephone receiver of sensitive type. 2 designates the relay referred to, having a diaphragm 3 on which is mounted, usually, a silver contact plate 4. I have not indicated the particular manner of support of this diaphragm in the case 5 of the instrument, as various methods of mounting such diaphragms are well known.

6 designates a bracket projecting from the case 5 toward the front, and 7 designates a long-period coil spring, the outer end of which is bent down and into contact with plate 4, while the inner end of said spring is mounted on a screw 8, itself mounted on said bracket, by which screw the pressure of the spring against the plate 4 may be regulated. The diaphragm 3 and bracket 6 constitute electric terminals, and to them are connected the wires of a circuit 9, containing a battery 10 and an electro-responsive instrument such as a relay 11, the latter controlling a circuit 12 containing a battery 13 and suitable signal indicating means, for example a bell 15 and lamp 16.

The actuating magnet coils, 17, of relay 2 (such coils being indicated diagrammatically only in the drawing), are in the circuit 18 of the detector 1; which circuit also contains a battery 19. Obviously, if a sound cause the operation of detector 1, telephonic current waves of relatively high frequency produced thereby and transmitted through circuit 18 will cause the diaphragm 3 of relay 2 to vibrate at a rapid rate, while spring 7, the natural period of vibration of which is much lower, and which under the circumstances will vibrate only at that natural rate, in effect loses contact with diaphragm 3 (for spring 7 and diaphragm 3 touch each other so briefly and at such relatively remote intervals that sufficient current does not pass during the intervals of contact to operate relay 11), and hence the armature of relay 11 falls, causing the operation of bell 15 and the lighting of lamp 16.

In practice, it is desirable to protect relay 2 from the effects of external vibration; to this end I have shown said relay supported by springs 20. Furthermore this relay is usually located in a well-protected place, preferably the premises in which the signal-indicating devices such as 15 and 16, are located; the circuit 18 being in effect a telephone circuit which may be protected from induction and other disturbances by carrying it in a twisted pair and preferably in a cable. Circuit 18 is constantly under test, for a short circuit or a break will always cause the diaphragm to vibrate, owing to charging or discharging of the magnet coils of the relay.

What I claim is:—

An alarm system, comprising a telephonic detector, a telephonic relay embodying two contact members, one responding to telephonic impulses and the other having a lower period of vibration, means for varying the last mentioned period of vibration, means for protecting said contact members from external vibrations, a circuit connecting said detector and said relay, and a normally closed circuit connected to said contact members and including an electro-responsive instrument.

In testimony whereof I have signed this specification in the presence of two subscribing witnesses.

RICHARD M. HOPKINS.

Witnesses:
A. E. STEARNS,
E. N. RABAN.